United States Patent [19]

Goss et al.

[11] Patent Number: 5,749,152
[45] Date of Patent: May 12, 1998

[54] SPIRIT LEVEL VIAL CONSTRUCTION

[76] Inventors: William A. Goss, 283 Egrets Walk, Orange Park, Fla. 32073; Lawrence T. Goss, 257 Main St., Wakefield, R.I. 02879

[21] Appl. No.: 856,589

[22] Filed: May 15, 1997

Related U.S. Application Data

[63] Continuation of Ser. No. 500,263, Jul. 10, 1995, abandoned.

[51] Int. Cl.$^6$ ................................ G01C 9/28
[52] U.S. Cl. ..................... 33/381; 33/390; 33/377
[58] Field of Search ...................... 33/365, 377, 379, 33/390, 366, 381, 382

[56] References Cited

U.S. PATENT DOCUMENTS

| | | | |
|---|---|---|---|
| 1,898,367 | 2/1933 | Heinze | 33/390 |
| 2,635,350 | 4/1953 | Bettega . | |
| 3,061,920 | 11/1962 | Johnson | 33/390 |
| 3,513,558 | 5/1970 | Kuchta et al. . | |
| 3,842,514 | 10/1974 | Scheyer | 33/379 |
| 3,878,617 | 4/1975 | West et al. | 33/369 |
| 3,889,353 | 6/1975 | Provi . | |
| 4,164,077 | 8/1979 | Thomas | 33/366 |
| 4,559,714 | 12/1985 | Wright | 33/379 |
| 4,759,134 | 7/1988 | Chrisley . | |
| 4,854,047 | 8/1989 | Conanan | 33/377 |
| 5,003,699 | 4/1991 | Wright | 33/379 |
| 5,154,823 | 10/1992 | Ma et al. . | |
| 5,269,066 | 12/1993 | Walters . | |
| 5,272,816 | 12/1993 | Fuliwara | 33/379 |
| 5,279,041 | 1/1994 | Wright . | |
| 5,339,530 | 8/1994 | Wright . | |
| 5,476,258 | 12/1995 | Frisone | 33/377 |

FOREIGN PATENT DOCUMENTS

| | | | |
|---|---|---|---|
| 1192818 | 10/1959 | France | 33/390 |
| 2564580 | 11/1985 | France | 33/390 |
| 2613475 | 10/1988 | France | 33/390 |
| 55-36736 | 3/1980 | Japan . | |
| 1147408 | 4/1969 | United Kingdom . | |

Primary Examiner—Thomas B. Will

[57] ABSTRACT

A spirit level vial construction provides various refinements in the structure and method of manufacture of vials used for the containment of fluid and adapted to be installed in spirit levels. The construction is particularly adapted to use with spherical vials, i. e., level vials having a concave spherical form within the sight glass portion containing the bubble, and adapted to provide level information relative to a planar surface. However, the present construction may also be used for tubular type level vials. Vials using the present construction are formed of plastic materials (particularly acrylics) for economy, and are preferably molded by an injection molding method in order to reduce substantially any warping or deformation during the molding process. Various clear or dyed fluids which are compatible with the plastics may be used, particularly mineral spirits. The vial components are permanently assembled and sealed preferably by sonic welding, in order to preclude any leakage of the fluid from the vial seam. The result is an economically manufactured, yet durable level vial having great longevity and utility.

2 Claims, 3 Drawing Sheets

SPIRIT LEVEL VIAL CONSTRUCTION

CROSS REFERENCE TO RELATED APPLICATION

This application is a continuation of application Ser. No. 08/500,263 filed on Jul. 10, 1995, abandoned.

FIELD OF THE INVENTION

The present invention relates generally to level type hand tools and instruments, and more specifically to the specific construction of the vial or vials for liquid filled vial or "spirit" type levels. Such vials or vial components may be economically but accurately injection molded of plastic, with the vial(s) then being sealed by a sonic welding technique to ensure that no leakage of the fluid contained therein, will occur.

BACKGROUND OF THE INVENTION

"Spirit" levels, in which a fluid (traditionally, mineral spirits, kerosene, or similar substances) is encapsulated within a sealed transparent vial with an air space providing a visible bubble, have been known and used for quite some time. Generally, such levels utilize an elongate glass tube with a very slight curvature formed therein, wherein the air bubble will rise to the top of the curvature when the level instrument is positioned substantially horizontally. Such levels have also been formed in a "bullseye" configuration, i. e., having a generally circular configuration with a slight spherical curvature so that the air bubble will automatically be positioned in the center or "bullseye" of a concentric series of circular markings on the spherical glass. Such levels are practical for checking the level of a surface or object in one dimension (for elongate tubular vials) or the level of a plane (two dimensions, for spherical "bullseye" levels). Multiple vials have been installed in single instruments and oriented in different planes, for further versatility.

While glass serves as a suitable material for such vials, it has its limitations. The material is brittle and prone to breakage, which occurs from time to time in such instruments due to their use in the field as a hand tool. Moreover, glass can be difficult to seal properly. Mechanical seals (i. e., an elastomer held in place by mechanical means) are prone to leakage due to seal deterioration and varying pressure within the vial due to the expansion and contraction of the air bubble captured therein, as the temperature varies. While glass vials (particularly tubes) have been sealed by melting the end of the tube closed, glass requires extreme heat, and it is extremely difficult to create the required heat without evaporating or burning the fluid therein, and/or fracturing the tube due to thermal stresses imposed while keeping the remainder of the tube sufficiently cool to preclude loss of the fluid therein.

Accordingly, various clear plastics have been used for level vials. While this reduces the problem of breakage, it has been difficult to find suitable plastic for such purpose. Heat applied to the vial to melt the vial closed in order to seal the liquid therein, often results in distortion of the plastic material of the vial, thereby greatly reducing accuracy. Chemical sealing by means of an adhesive or solvent, has been less than satisfactory, as such solvents must be compatible with the captured fluid, as well as being chemically reactive with the plastic. Such closures often result in at least some porosity, thereby allowing the fluid captured therein to leak, particularly as the air bubble pressure increases due to temperature increases. In some instances, long term compatibility of the fluid with the vial material has been a problem, with the fluid attacking the plastic of the vial.

Accordingly, a need will be seen for a spirit level vial construction wherein a suitable plastic material is used for the vial, which material is compatible with the fluid captured therein over a long term period. The method of forming the vial must provide the required degree of accuracy, particularly for the uppermost portion including the sight lines and bubble when the level is positioned substantially horizontally. Finally, the sealing means for the vial must be suitable, resulting in a perfect seal for the vial, no loss of fluid from within the vial, and further precluding any deformation of (particularly the upper portion) the vial, in order to provide the required degree of accuracy.

DESCRIPTION OF THE PRIOR ART

U.S. Pat. No. 2,635,350 issued to Louis C. Bettega on Apr. 21, 1953 describes a Leveling And Plumbing Device And Elements Thereof, utilizing a spherical or "bullseye" type vial(s). In at least one embodiment, the vials are formed to approximate a square shape with slightly curved sides, in order that the sides may be used as levels when the spherical vial is on edge. The resulting general appearance is similar to a spherical vial of one embodiment of the present invention, but no related structure or construction is disclosed by Bettega. Moreover, while Bettega suggests the use of plastics for his vial, he fails to mention the use of acrylics, and in fact specifies alcohol as the fluid within the vial. Alcohols are generally incompatible with the preferred acrylic of the present invention, depending upon the specific chemical formula, and accordingly the present invention is primarily directed to the use of mineral spirits or other compatible liquid.

U.S. Pat. No. 3,513,558 issued to Frank J. Kuchta et al. on May 26, 1970 describes a Level And Method Of Making Same. The level vials are elongated tubular units, and no means of sealing the vials is disclosed. While Kuchta et al. make mention of materials for the vial body (i. e., the component which holds the vial, rather than the vial itself), no mention is made of materials for the vial or for the fluid therein.

U.S. Pat. No. 3,889,353 issued to Mike A. Provi on Jun. 17, 1975 describes a Method Of Making A Composite Metal And Plastic Level, wherein a plastic material of specified density is molded into a metal frame. No specific construction for the level vials is disclosed; Provi makes mention of the use of glass or clear plastic only for the windows which enclose and protect the vials. Moreover, no mention is made of any means of assembling or sealing the vials, or of any specific type of fluid therein.

U.S. Pat. No. 4,759,134 issued to Barney D. Chrisley on Jul. 26, 1988 describes a Flexible Level wherein the "vial" is a continuous elongate clear plastic tube, enabling the unit to be used for remote leveling of objects as far apart as the length of the tube. The ends of the tubes are expanded to form balloon like structures, which may expand and contract according to atmospheric pressure as the fluid flows through the integral tube. Heat sealing of the tube ends by radio frequency is mentioned. However, the required flexibility of the tube precludes the use of relatively rigid plastic materials, such as acrylics, and by its nature the device includes entrapped air at each end of the depending tube, rather than a single air bubble generally at the center of an arched tube or spherical vial, as provided by the present invention.

U.S. Pat. No. 5,154,823 issued to Jack Ma et al. on Oct. 13, 1992 describes a Filter Apparatus And Distributor Plate Therefor. Molding, and particularly injection molding, is mentioned as a means of forming components of the apparatus, and sonic welding is mentioned as a means of permanently assembling at least some of the components together. However, the disclosure makes no mention of any clear plastic components, nor of sealing any components (clear and clear, or clear and translucent or opaque) with one another, nor of providing sealing devoid of porosity to preclude any leakage of a fluid therefrom, as required for the present invention. The art of filter housing construction is far removed from that of spirit level construction, and accordingly it is submitted that it is not at all obvious to apply any of the Ma disclosure to the construction of the present level vials.

U.S. Pat. No. 5,269,066 issued to Christopher L. Walters on Dec. 14, 1993 describes a Carpenter's Level And Square, in which each leg of the square is spaced apart longitudinally and two spaced apart parallel walls of clear material (glass or plastic) are installed therein, to capture a liquid therebetween. Thus, each leg of the square may be used as a level. However, the clear sides of the liquid chamber are of a different material than the square, precluding the use of sonic welding for sealing the liquid chambers. In addition, the chambers must be devoid of curvature, in order to fit within the straight body of the square legs. The indices are at each end of the level chambers, rather than in the center, due to the straight chambers. No means is provided for the inclusion of a spherical level in the Walters device, and no fabrication of components by injection molding is disclosed.

U.S. Pat. No. 5,279,041 issued to Randall J. Wright on Jan. 18, 1994 describes a Level Straight-Edge Apparatus And Method Of Construction. The body of the apparatus is of a generally triangular cross section. In one embodiment, the body is plastic, with the apex of the triangular section being formed by the straight edge. In the other embodiment, the cross section is defined by a T-shaped structure comprising the base and bisector of the triangular section, with the remainder of the section being formed by plastic material. The level vials are installed in the body sections, as desired. No specific material or construction means is described for the level vials, other than to note that they are generally cylindrical.

U.S. Pat. No. 5,339,530 issued to Randall J. Wright on Aug. 23, 1994 describes a Hand Level Instrument With Composite Metal And Plastic Body, wherein the plastic portion of the device is injection molded and uses the metal frame as an integral portion of the mold. While cylindrical level vials are disclosed, no specific material for the vials is mentioned, nor is any specific internal fluid; the only specific material disclosure is for the types of plastics which may be used for the body of the device, rather than for the vial. Acrylic is not mentioned. The only sealing means described is a separate plug inserted into one end of the tubular vial, unlike the present vial closure means.

British Patent No. 1,147,408 issued to Albert Wullschleger and published on Apr. 2, 1969 describes Improvements In Or Relating To A Bubble-Body For A Spirit Level. The body is an essentially rectangular, clear plastic unit with a tubular hollow therein for the fluid and bubble. No specific plastic material or fluid is disclosed, nor is any specific sealing means mentioned.

Finally, Japanese Patent No. 55-36736 and published on Mar. 14, 1980 describes various level vial configurations, including cruciform tubular configurations within circular or oval vials and also a conventional spherical or "bullseye" vial shape. However, no material for either the vial or the fluid, nor any sealing means, is disclosed.

None of the above noted patents, taken either singly or in combination, are seen to disclose the specific arrangement of concepts disclosed by the present invention.

SUMMARY OF THE INVENTION

By the present invention, an improved spirit level vial construction is disclosed.

Accordingly, one of the objects of the present invention is to provide an improved spirit level vial construction which is adaptable to spherical vials providing planar level indication, and also to tubular vials providing linear level indication.

Another of the objects of the present invention is to provide an improved spirit level vial construction which makes use of molded vial components, and in particular utilizes injection molding to reduce substantially warping and deformation of parts.

Yet another of the objects of the present invention is to provide an improved spirit level vial construction which utilizes plastics for the vial components, and in particular utilizes acrylic materials.

Still another of the objects of the present invention is to provide an improved spirit level vial construction which utilizes a fluid such as mineral spirits, which fluid is compatible with plastic vial materials, and particularly with acrylics.

A further object of the present invention is to provide an improved spirit level vial construction which utilizes means for positively sealing and encapsulating the vial fluid within the vial, which means may comprise sonic welding of the two vial components.

An additional object of the present invention is to provide an improved spirit level vial method of construction and the steps involved therein.

A final object of the present invention is to provide an improved spirit level vial construction for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
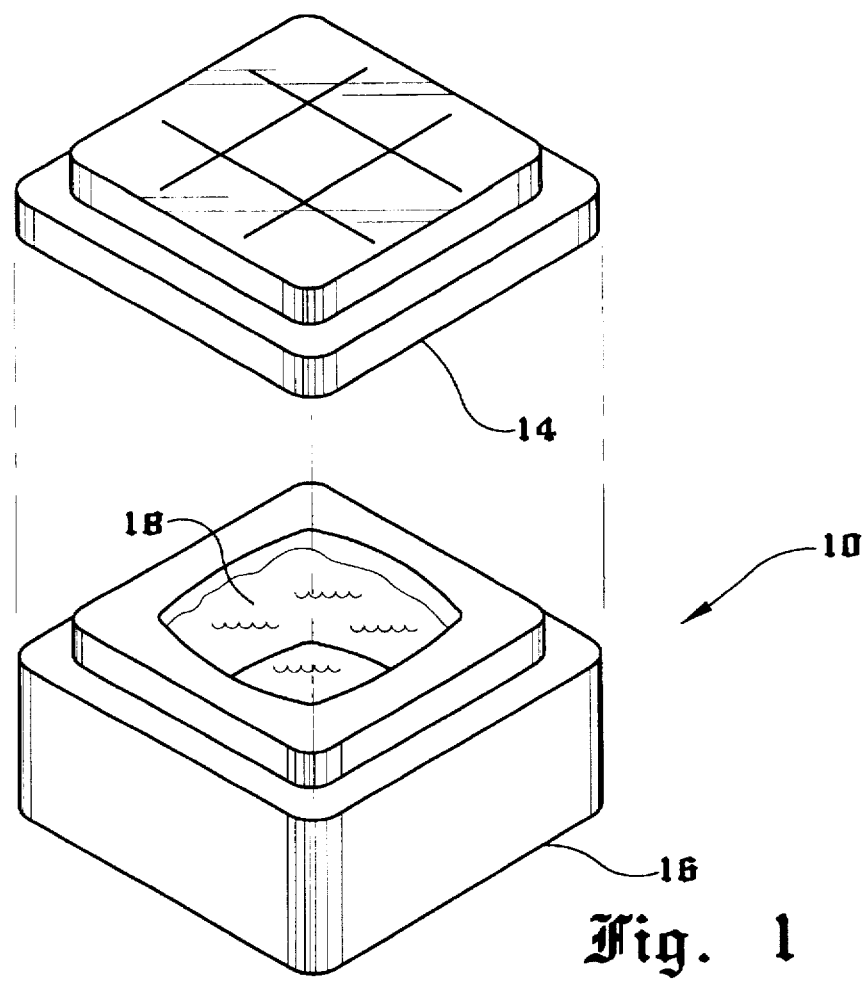
FIG. 1 is an exploded perspective view of a spirit level spherical vial of the present invention, showing the specific configuration and structure of the two vial components.
Figure 2:
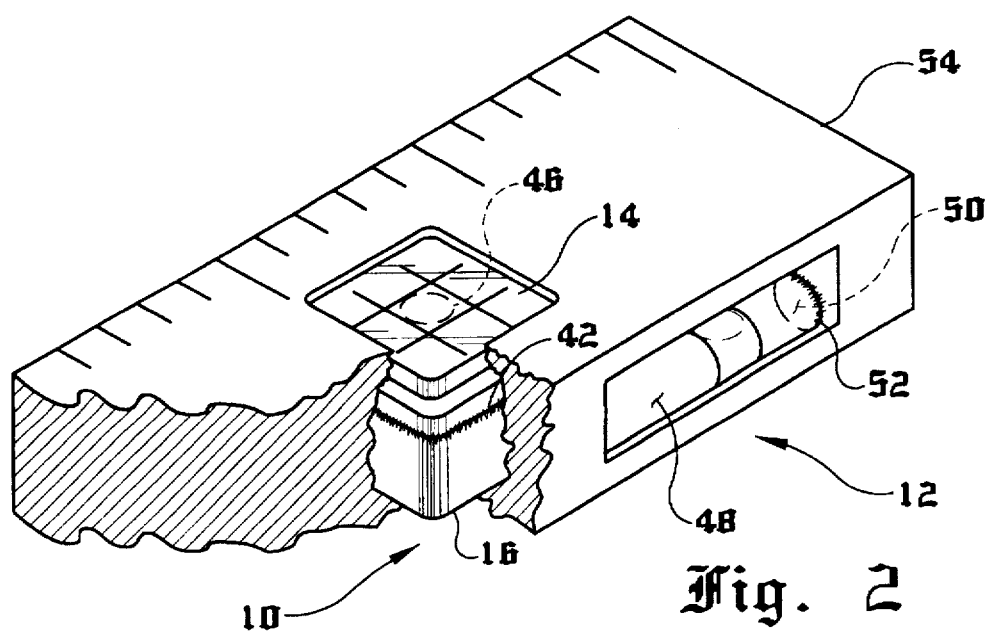
FIG. 2 is a broken away perspective view of a spirit level, showing further details of the construction of a spherical vial and a tubular vial used therein.

Referring now particularly to FIGS. 1 and 2 of the drawings, the present invention will be seen to relate to a spherical spirit level vial 10, as well as a tubular type vial 12 which may be formed in much the same manner. While the majority of the present specification relates to a spherical vial 10 and its construction and manufacture, it will be seen that many of the materials and steps of manufacture may relate also to a tubular vial 12.

The present spherical vial 10 is formed of a first component 14 comprising a clear, transparent sight glass, and a second component 16 comprising a fluid receptacle. While the sight glass 14 must be clear, or at least translucent, the underlying fluid receptacle component 16 may be formed of clear, translucent, or opaque materials, as desired. It may be more desirable to form the fluid receptacle of a white, or at least light colored material, in order that the fluid and level bubble therein may be more readily observed.

Preferably, the two components 14 and 16 are formed of a plastic material, for economy of manufacture. Acrylics have been found to work well, so long as the fluid within the vial 10 is chemically inert relative to the materials of the vial components 12 and 14. Accordingly, a mineral spirits fluid or kerosene has been found to be chemically compatible with the acrylic plastic material of the vial components 12 and 14, and is used for the fluid 18 within the vials 10 and 12. Other fluids may be used, so long as they are chemically compatible with the materials used to form the vial components 14 and 16, and do not react chemically with the vial components in either short or long term reactions. The mineral spirits fluid 18 or other vial fluid, may be dyed to provide a greater color contrast for ease of viewing, if desired.

Figure 3:
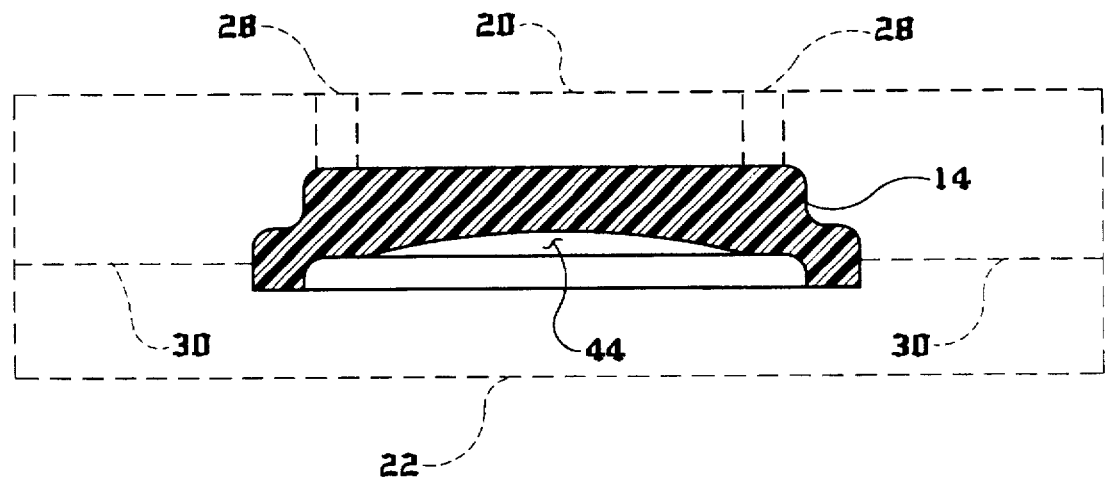
FIG. 3 is a side view in section of the sight glass component of a spherical vial of the present invention, with an injection mold therefor shown in broken lines.
Figure 4:
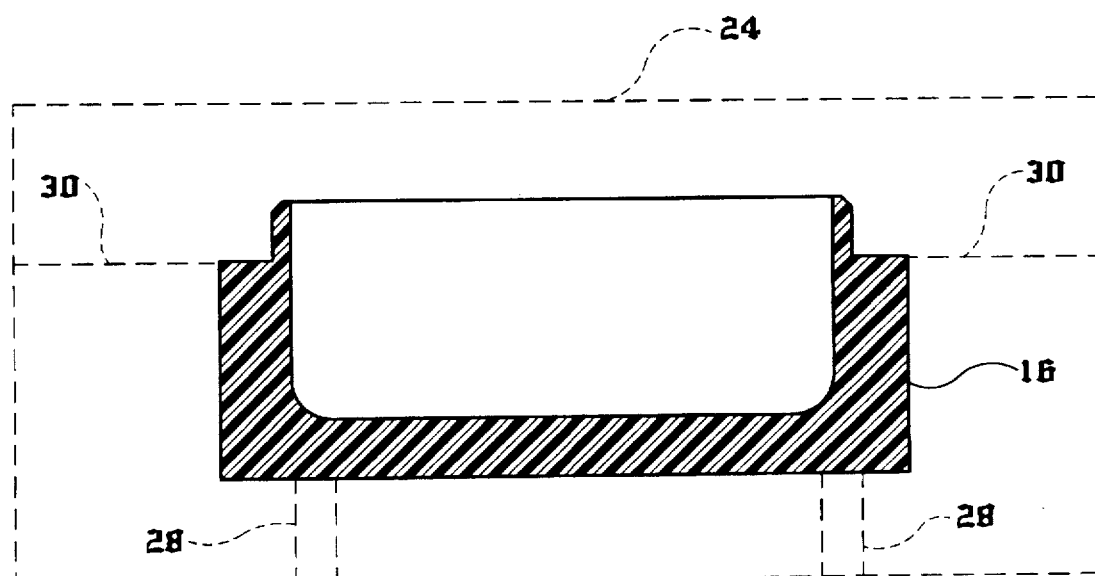
FIG. 4 is a side view in section of the fluid receptacle component of a spherical vial of the present invention, with an injection mold therefor shown in broken lines.

When using plastics for the vial components 14 and 16, caution is required in order to minimize or preclude warping or deformation of the plastic components as they cool. Any such warping can lead to inaccurate indications in the sight glass due to an asymmetric configuration when cooled, inaccurate placement within the level due to difficulty in aligning the deformed fluid receptacle, and/or difficulty in sealing the two components due to misalignment of the two components due to warping. Accordingly, the present vial components 14 and 16 are preferably formed by means of injection molding, as indicated in FIGS. 3 and 4. By injection molding the components, their shapes are absolutely maintained within the mold halves or sections, precluding any possibility of warping or other deformation due to hot flow. The result is extremely accurate reproduction of the components 14 and 16 of the present vial 10, and their mating surfaces. (It will be seen that such injection molding is equally adaptable to the tubular vial 12 of FIG. 2.)

Figure 5:
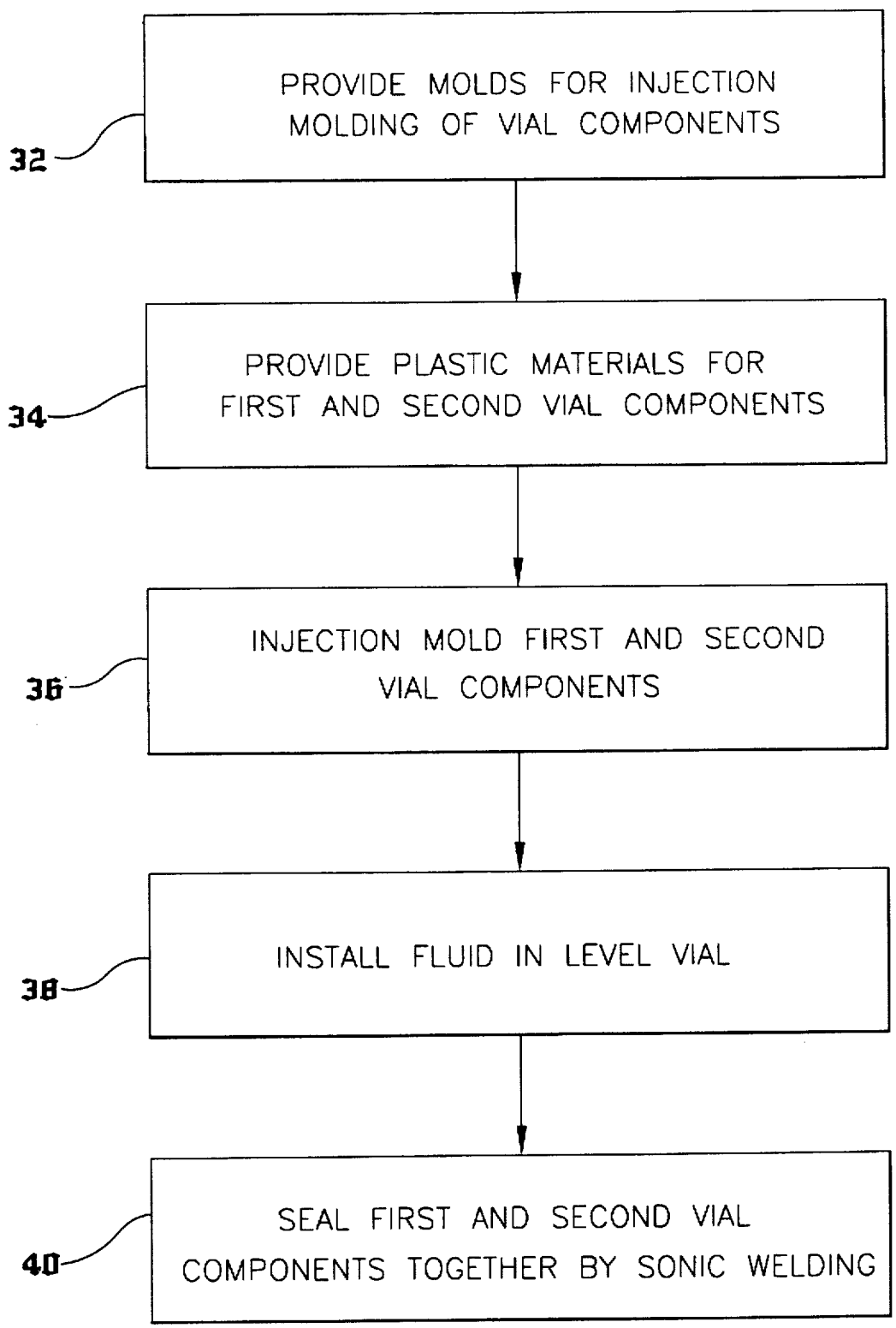
FIG. 5 is a block diagram or flow chart, showing the steps involved in the construction of a spirit level vial according to the present invention.

The vial formation and injection molding process is shown generally in the flow chart of FIG. 5. Each of the components 14 and 16 have their own molds, with the sight glass component 14 being formed in the two mold halves 20 and 22 of FIG. 3 and the fluid receptacle component being formed in the two mold halves 24 and 26 of FIG. 4. (Each of the mold components 20, 22, 24, and 26 is shown in broken lines in FIGS. 3 and 4.) Injection passages 28 and mold component parting lines 30 are also provided for each mold. The two molds form the two vial components 14 and 16 with closely fitting tolerances so they will seat together well upon assembly. The provision of the molds is indicated generally in the first step 32 of FIG. 5.

The molten plastic material provided in the second step 34 of FIG. 5, is injected into the assembled mold halves or portions 20/22 and 24/26, as generally indicated in the third step 36 of FIG. 5. After the plastic material has cooled and hardened, the mold halves or portions 20/22 and 24/26 are respectively separated, and the accurately molded components 14 and 16 are removed, with any flashing or sprue from the injection passages being removed.

The fluid receptacle portion 16 of the vial 10 may then be filled with an appropriate fluid 18 (either clear or dyed, for better contrast), as indicated in the fourth step 38 of FIG. 5. The fluid level provided is sufficiently high to leave only a relatively small bubble within the top of the concave spherical curvature of the sight glass component 14. The two components 14 and 16 are then permanently and imperviously sealed together by sonic welding to form the completed level vial, as indicated in the fifth and final step 40 of FIG. 5.

It will be seen that no matter how accurate the vial components themselves may be, that it is also critical that they be secured together without any warping or deformation occurring during the process, and that the seam or joint formed between the two components be absolutely leakproof and non-porous. Many adhesives are actually solvents, which soften the materials with which they come in contact. This can lead to the undesirable warping or deformation of the components, which is to be avoided in the interest of producing an accurate vial. The chemical dissolution of the materials can also create porosity in the materials, thereby providing leakage paths for the fluid contained within the vial. Also, while such adhesives may be suitable for bonding the two vial components together, they may not be compatible with the vial fluid contained therein, and lead to undesirable chemical reactions between the adhesive and the fluid, and/or act as a catalyst promoting an undesirable reaction between fluid and vial material.

The present vial construction provides for the permanent and impervious sealing of the two components 14 and 16 by means of sonic welding, in order to preclude the use of any adhesives which may not be compatible with the fluid 18 contained within the assembled vial 10 or 12 and/or the vial components. Such sonic welding melds the two components together by sonically exciting the adjacent materials to cause them to heat to a locally viscous state and melt together. Such sonic welding is highly controllable, by means of focusing phase differences to cancel or amplify the desired molecular excitement, and as a result produces an extremely accurate and non-porous joint between the two components, as indicated by the weld joint 42 shown in FIG. 2.

The above discussion has been directed primarily to the spherical level vial 10, and its components 14 and 16, of FIGS. 1 through 4. Such a spherical level vial 10 includes a spherically shaped concave area 44 within the sight glass portion 14, which allows the vial 10 to check the slope of a surface or object relative to the horizontal, simultaneously in two dimensions defining a plane. The bubble 46 (FIG. 2) will drift in any direction within the concave spherical area 44, depending upon any angular deviation from the horizontal of the object being measured.

While the accuracy of the assembled spherical level vial 10 is of great importance, it is equally as important to insure that it is accurately installed within a level vial housing, exemplified by the housing 54 shown in FIG. 2. By forming the outer contours of the spherical vial components 12 and 14 to have a substantially square shape, as shown, any turning or displacement of the assembled spherical level vial 10 within the level 54 is substantially reduced or precluded, thereby assuring that the orientation of the level vial 10 relative to the level housing 54 remains constant for optimum accuracy of the level.

The above level vial construction will be seen to apply also to a cylindrical type vial, represented by the vial 12 of FIG. 2. The acrylic materials, mineral spirits fluid, and injection molding technique are equally adaptable to such cylindrical vials, with the vial being formed of a cylindrical first component 48 and a cap second component 50. As in the case of the spherical level vial 10 described above, the tube 48 is substantially filled with a suitable fluid (leaving sufficient volume for an air bubble), and the cap 50 is sonically welded to the tube 48, as indicated by the sonic weld joint 52 in FIG. 2.

Such tubular or cylindrical level vials 12 are well suited for checking the level of an elongate object relative to the horizontal, and/or checking the linear level of a surface in only a single dimension. As such cylindrical levels 12 are relatively narrow, they may be installed nicely within the relatively narrow edge of a level (as in the rectangular level vial housing 54 shown partially in FIG. 2). However, greater versatility is provided by a spherical level vial 10, due to its ability to check the level of a planar surface in any direction of the plane, in a single measurement.

The above described vial construction will be seen to provide a very economical means of producing an extremely accurate spherical or cylindrical level vial, which vials are also extremely durable due to the plastic materials being used and the chemical compatibility of the various materials and assembly methods. The use of sonic welding of the injection molded components ensures that the joint produced is leakproof, and precludes the use of adhesives or solvents which may not be compatible with the vial materials and/or the fluid contained therein. The present vial construction will be seen to be adaptable to various different types of level housings, and is not limited to the level housing 54 shown in FIG. 2. Plural spherical and/or cylindrical level vials 10 and/or 12 may be installed in different orientations and planes within level housings of various configurations, to provide great versatility while also providing economy and durability.

It is to be understood that the present invention is not limited to the sole embodiments described above, but encompasses any and all embodiments within the scope of the following claims.

We claim:

1. A level comprising:

a housing having a square receiving section and a rectangular receiving section;

a sonically welded, square-shaped vial having an injection molded, clear sight glass cover and an injection molded fluid receptacle sonically welded together with a dyed mineral spirits fluid permanently sealed therein, said square-shared vial installed within said square receiving section for providing planar level information relative to an object;

a sonically welded, cylindrical shaped vial having an injection molded, clear sight glass body and an injection molded, clear end cap sonically welded together with a dyed mineral spirits fluid permanently sealed therein, said cylindrical shaped vial installed within said rectangular receiving section for providing linear level information relative to the object;

each said vial being formed of injection molded acrylic plastic material.

2. The level of claim 1, wherein said fluid receptacle is opaque.

* * * * *